(12) United States Patent
Kinberg et al.

(10) Patent No.: US 6,213,342 B1
(45) Date of Patent: Apr. 10, 2001

(54) CANDY DISPENSER SIMULATING A CANDY FACTORY

(75) Inventors: Benjamin Kinberg, New York, NY (US); Marc W. Zak, Sonoma, CA (US)

(73) Assignee: OddZon, Inc., Pawtucket, RI (US)

( * ) Notice: Subject to any disclaimer, the term of this patent is extended or adjusted under 35 U.S.C. 154(b) by 0 days.

(21) Appl. No.: 09/304,515

(22) Filed: May 3, 1999

(51) Int. Cl.[7] ................................................ A24F 15/04
(52) U.S. Cl. ................................................ 221/24; 221/155
(58) Field of Search ........................... 221/24, 155, 258, 221/266, 289, 199

(56) References Cited

U.S. PATENT DOCUMENTS

| | | |
|---|---|---|
| 1,354,307 | 9/1920 | Joslin . |
| 1,725,965 | 8/1929 | Ormiston . |
| 3,660,930 | 5/1972 | Indjian ................................. 46/117 |
| 3,828,970 | 8/1974 | Yamamoto ........................... 221/24 |
| 4,360,988 | 11/1982 | Schoenfield et al. ................ 46/39 |
| 4,976,376 | 12/1990 | Williams .............................. 221/24 |
| 5,306,192 | 4/1994 | Caveza et al. ....................... 446/71 |
| 5,385,267 | 1/1995 | Diamond et al. .................... 221/248 |
| 5,651,475 | 7/1997 | Fenton ................................. 221/24 |

OTHER PUBLICATIONS

"Cap Candy Catalog", 1998, pp. 9–18.

Primary Examiner—Kenneth W. Noland
(74) Attorney, Agent, or Firm—Marshall, O'Toole, Gerstein, Murray & Borun

(57) ABSTRACT

An apparatus for dispensing candy and simulating at least one candy making process. The apparatus has a chamber for storing real candies and a dispensing opening through which the candies are discharged. A dispensing mechanism is located between the chamber and the dispensing opening and adapted to periodically dispense pieces of candy. The apparatus includes at least one simulated candy processing station, such as a mixing station, a candy forming station, or a candy wrapping station. The dispensing mechanism and simulated candy processing station(s) are coupled to a drive assembly, such as a gear train, disposed within an apparatus housing. The drive mechanism simultaneously operates the dispensing mechanism and simulated station(s) when actuated, such as by a switch. The apparatus dispenses real candies while the simulated candy processing stations operate to create the appearance that the apparatus is actually making the candy.

20 Claims, 6 Drawing Sheets

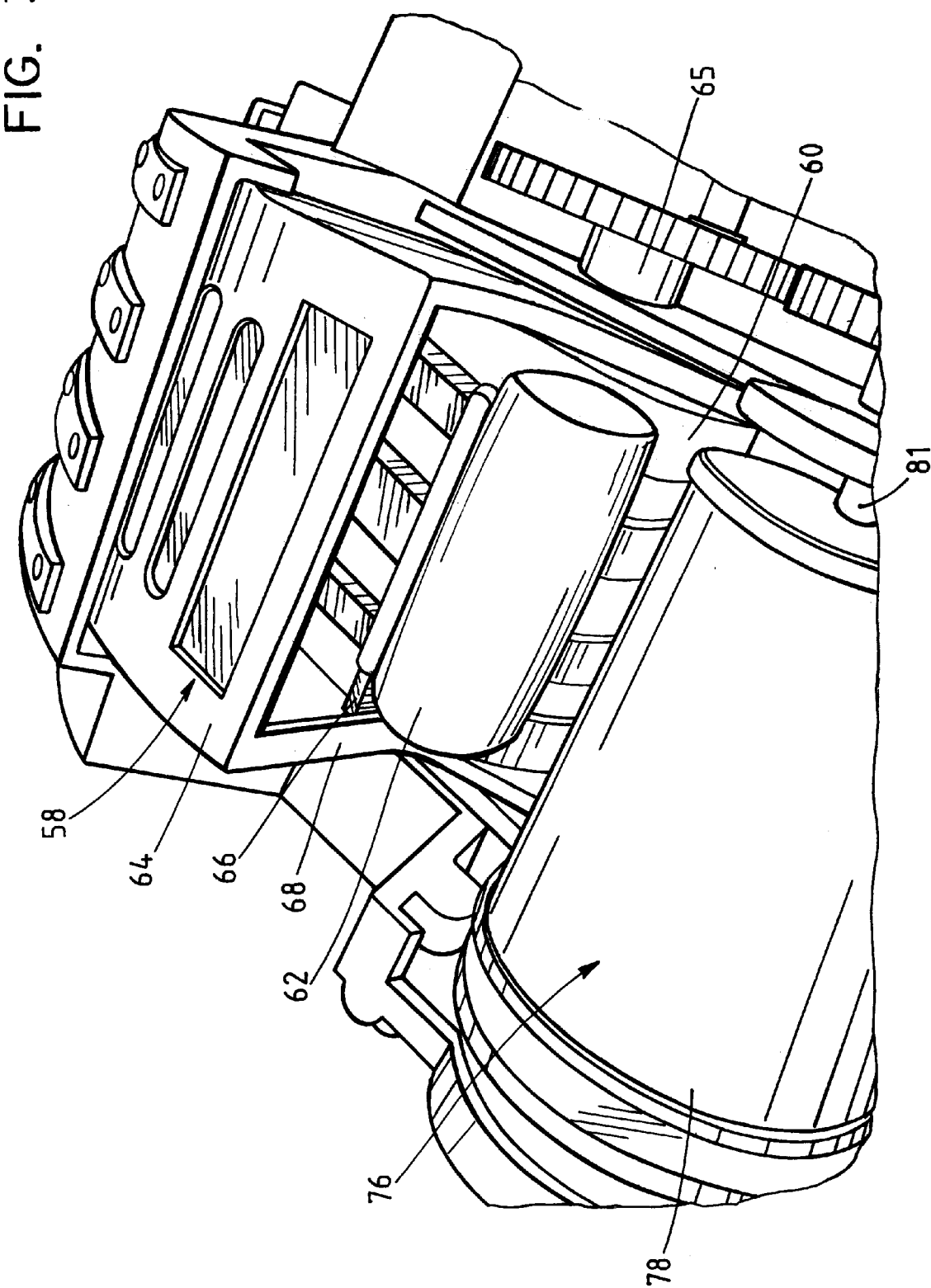

CANDY DISPENSER SIMULATING A CANDY FACTORY

FIELD OF THE INVENTION

The present invention relates to candy dispensers, and more particularly relates to a candy dispensing mechanism which simulates one or more candy forming stations.

BACKGROUND OF THE INVENTION

Candy dispensers are generally well known in the art and come in a wide variety of shapes and sizes. It is safe to assume that a relatively high percentage of candy purchases are made by (or at least at the direction of) children. However, the typical child has little if any brand loyalty, and thus candy manufacturers have long relied on clever packaging in order to attract the purchaser's attention. One marketing approach has been to put the candy in an attractive candy dispenser designed to appeal to children and/or adults. For example, many members of the public can recall the very popular Pez® candy dispensers. Other candy packages rely on the use of licensed cartoon characters, action figures, or even the name of a popular sports personality. Thus, it is a commonly held belief that a candy container or dispenser that incorporates one or more novel or unique features is very likely to significantly increase the sales of that candy product. Therefore, there is a continuing need for novel candy containers and dispensers.

SUMMARY OF THE INVENTION

According to one aspect of the present invention, a candy dispenser simulating a candy factory is provided having a housing, a gear train disposed within the housing, and a switch adapted to operate the gear train. A simulated candy mixing station is provided having a hopper, an impeller supported for rotation inside the hopper and operatively connected to the gear train, and simulated unformed candy disposed inside the hopper. A simulated candy forming station is also provided, comprising a rotatable form cylinder operatively connected to the gear train, and a simulated piece of candy formed at an outer periphery of the form cylinder. The apparatus also comprises a simulated candy wrapping station having a rotatable wrap cylinder operatively connected to the gear train, and a simulated wrapper disposed about an outer periphery of the wrap cylinder. A wrapped candy discharge station is provided having a loading chamber sized to house at least one piece of candy, a dispensing opening, and a discharge path extending from the loading chamber to the dispensing opening. A rotatable cradle is disposed in the discharge path and operatively connected to the gear train, the cradle responsive to operation of the gear train to rotate to a first position in which the cradle prevents passage of candy through the dispensing opening, and a second position in which the cradle permits passage of candy from the loading chamber to the dispensing opening.

In further accordance with a preferred embodiment of the invention, the candy dispenser further comprises a simulated candy material pumping station in which the housing includes a first piston opening, a first simulated piston cap is disposed in the first piston opening, and a first actuator has an upper end in contact with the first simulated piston cap and is operatively connected to a gear in the gear train. The first actuator reciprocates up and down along a substantially vertical path as the gear rotates.

In accordance with another aspect of the invention, an apparatus for simulating the formation of and dispensing cylindrically shaped chocolate candies is provided, the apparatus comprising a housing, a gear train disposed within the housing, and a switch adapted to operate the gear train. A simulated chocolate mixing station is provided comprising a hopper, an impeller supported for rotation inside the hopper and operatively connected to the gear train, and simulated chocolate nuggets disposed inside the hopper. The apparatus also includes a simulated forming station comprising a rotatable form cylinder operatively connected to the gear train, and a simulated cylindrically shaped chocolate candy formed at an outer periphery of the form cylinder. The apparatus provides a simulated wrapping station comprising a rotatable wrap cylinder operatively connected to the gear train, and a simulated wrapper disposed about an outer periphery of the wrap cylinder. A discharge station has a loading chamber sized to house at least one wrapped, cylindrically shaped chocolate candy, a dispensing opening, and a discharge path extending from the loading chamber to the dispensing opening. A rotatable cradle is disposed in the discharge path and operatively connected to the gear train, the cradle responsive to operation of the gear train to rotate to a first position in which the cradle prevents passage of a cylindrically shaped chocolate candy through the dispensing opening, and a second position in which the cradle permits passage of a cylindrically shaped chocolate candy from the loading chamber to the dispensing opening.

In accordance with additional aspects of the present invention, a candy dispenser simulating a candy factory is provided comprising a housing, a gear train disposed within the housing, an actuator adapted to operate the gear train, a simulated candy processing station operatively coupled to the gear train, and a candy discharge station having a loading chamber sized to house at least one piece of candy, a dispensing opening, a discharge path extending from the loading chamber to the dispensing opening, and a candy dispensing mechanism to periodically dispense pieces of candy when the actuator is actuated.

In accordance with still further aspects of the present invention, a candy dispenser simulating a candy factor is provided, the candy dispenser comprising a housing, a first simulated candy processing station, the first simulated candy processing station being of a first type, and a second simulated candy processing station, the second simulated candy processing station being of a second type different than the first type. The dispenser includes a candy discharge station having a loading chamber sized to house at least one piece of candy, a dispensing opening, and a discharge path extending from the loading chamber to the dispensing opening, the candy discharge station being operable to periodically dispense pieces of candy. A drive assembly is disposed within the housing, the drive assembly being coupled to operate the first simulated candy processing station, the second simulated candy processing station, and the candy discharge station.

Other features and advantages are inherent in the apparatus claimed and disclosed or will become apparent to those skilled in the art from the following detailed description and its accompanying drawings.

BRIEF DESCRIPTION OF THE DRAWINGS

FIG. 3 is an enlarged top view, in perspective, of the candy dispenser of FIG. 1.

DETAILED DESCRIPTION OF THE PREFERRED EMBODIMENT

The embodiment described herein is not intended to be exhaustive or to limit the scope of the invention to the precise form disclosed. The following embodiment has been chosen and described in order to best explain the principles of the invention and to enable others skilled in the art to follow its teachings.

Figure 1:
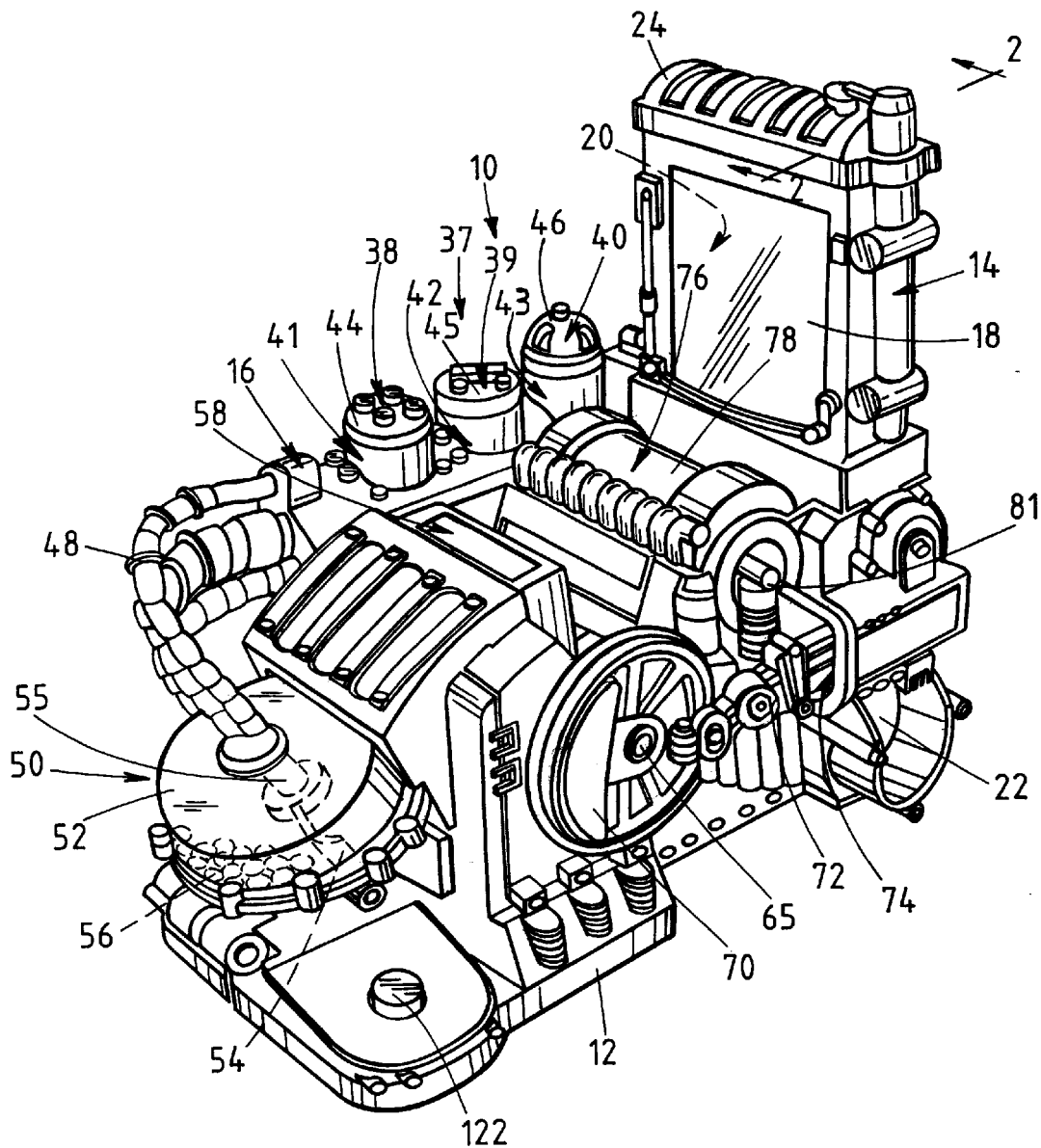
FIG. 1 is a perspective view of a candy dispenser constructed in accordance with the teachings of the present invention.

Referring now to FIG. 1 of the drawings, a candy dispenser constructed in accordance with the teachings of the present invention is generally referred to by the reference numeral 10. The candy dispenser 10 includes a housing 12 having a generally vertical portion 14 and a generally horizontal portion 16. The vertical portion 14 has an inlet section 18 defining a loading chamber 20, and a dispensing opening 22.

The horizontal portion 16 houses a number of simulated candy processing stations. In the illustrated embodiment, a simulated candy material pumping station 37 is provided comprising first, second, and third pistons 38, 39, and 40, respectively. As best shown in FIG. 1, the housing 12 has first, second, and third chambers 41, 42, 43 sized to receive respective piston caps 44, 45, 46. The piston caps 44–46 slidingly engage the chambers 41–43 and are supported to acuate up and down inside the chambers, as described in greater detail below. The piston caps 44–46 may be decorated so that they appear to contain candy material. Thus, the reciprocating action of the pistons 38–40 create the appearance that candy material is being pumped through the candy dispenser 10. In a preferred embodiment, the pistons 38–40 have a solid brown color which appears to be chocolate.

Figure 5:
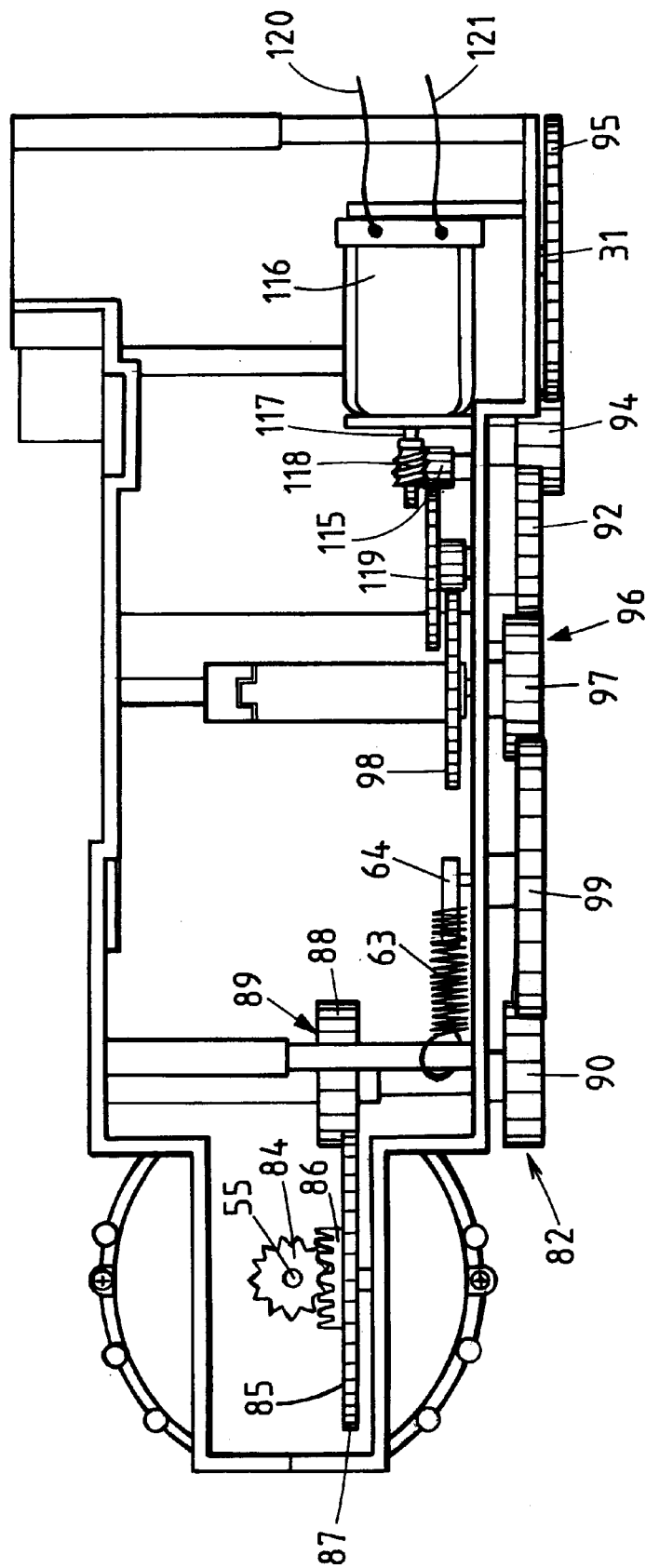
FIG. 5 is a bottom view of the candy dispenser of FIG. 1 with the housing and other components removed for clarity.

The pistons 38–40 of the simulated pumping station are connected by simulated hoses 48 to a simulated mixing station 50. As best illustrated in the FIG. 1, the simulated mixing station 50 comprises a cylindrical hopper 52, preferably formed of a clear plastic material. An impeller 54 is located inside of the hopper 52 and rotates about an impeller shaft 55 (FIGS. 1 and 5). Simulated nuggets 56 of candy material are disposed inside the hopper 52. The impeller 54 agitates the simulated nuggets 56 as it rotates, thereby to create the appearance that the simulated nuggets 56 of candy material are being mixed. The simulated nuggets 56 are preferably colored to match the pistons of the pumping station 37.

A simulated candy forming station 58 is located next to the simulated mixing station 50. As best illustrated in FIGS. 1 and 3, the simulated forming station 58 comprises a generally cylindrical form cylinder 60 supported for rotation about a substantially horizontal axle 65. A simulated piece candy 62 is formed at a periphery of the form cylinder 60 so that, as the cylinder 60 rotates, the forming station 58 appears to be advancing formed pieces of candy through the machine. In the alternative, the candy forming station may comprise a tumbler, which includes a barrel supported for rotation about an axle. The tumbler contains simulated pieces of candy material so that, as the tumbler rotates, the simulated pieces of candy material contact the tumbler to generate a simulated candy making noise.

Figure 4:
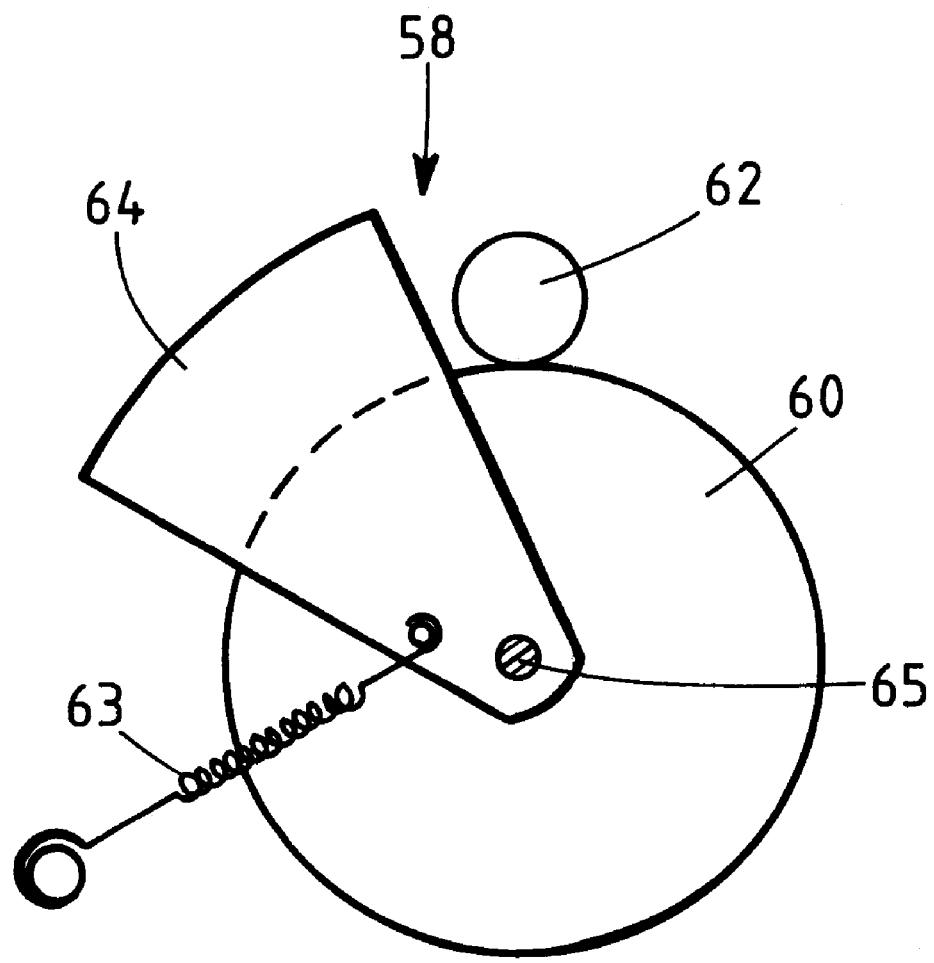
FIG. 4 is a side elevation view of a form station, with certain components removed for clarity.

To enhance the effect of the candy forming station 58, a reciprocating shield 64 is attached to and pivotally supported by the form cylinder axle 65. FIG. 4 illustrates the currently preferred embodiment of the forming station 58 with certain components removed for clarity of understanding. A spring 63 has a first end attached to the reciprocating shield 64 and a second end attached to a portion of the housing support structure. The spring 63 biases the shield 64 in a retracted position, in which the form cylinder 60 may be accessed from above. As best illustrated in FIG. 3, a lug 66 projects from the periphery of the form cylinder 60 to engage a side flange 68 of the shield 64. As the form cylinder 60 rotates, the lug 66 pushes against the side flange 68 thereby to pivot the shield 64 away from the simulated mixing station 50. When the shield 64 reaches an extended position, in which access to the form cylinder 60 is substantially closed, the lug 66 slides below a bottom edge of the side flange 68, thereby disengaging itself from the shield 64. When the lug 66 disengages the side flange 68, the spring 63 pulls the shield 64 back to the retracted position. The above operation is performed each time the form cylinder 60 rotates to create the appearance that the forming station 58 has formed the simulated nuggets 56 into pieces of candy which are then transported downstream. In a most preferred embodiment, the simulated piece of candy 62 has a generally cylindrical shape and a brown color to simulate a TOOTSIE ROLLS® brand chocolate candy.

In the currently preferred embodiment, a wheel 70 is attached to the form cylinder axle 65, as illustrated in FIG. 1. A simulated drive arm 72 has a first end pivotally connected to the wheel 70 and a second end disposed inside a pocket 74 of the housing 12. The wheel 70 rotates with the form cylinder 60 so that the simulated drive arm 72 pivots, creating the appearance that the simulated drive arm 72 drives the wheel 70 and attached form cylinder 60.

A simulated candy wrapping station 76 is located downstream of the simulated forming station 58. The simulated wrapping station 76 comprises a wrap cylinder 78 supported for rotation about a substantially horizontally aligned wrap cylinder axle 81. An outer periphery of the wrap cylinder 78 is decorated with art work which resembles a candy wrapper. Accordingly, as the wrap cylinder 78 rotates, it creates the appearance that the simulated piece of candy 62 in the forming station 58 is being wrapped. In the preferred embodiment, the art work resembles a wrapper for TOOTSIE ROLLS® brand candy.

Figure 2A:
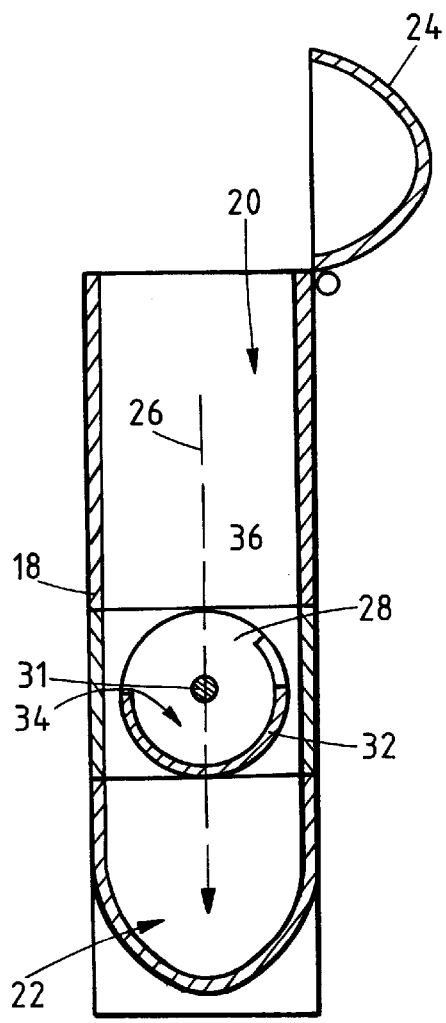
FIGS. 2A and 2B are elevation views, in cross-section, of an inlet section of the candy dispenser as taken along line 2—2 of FIG. 1, showing a cradle oriented in up and down positions.
Figure 2B:
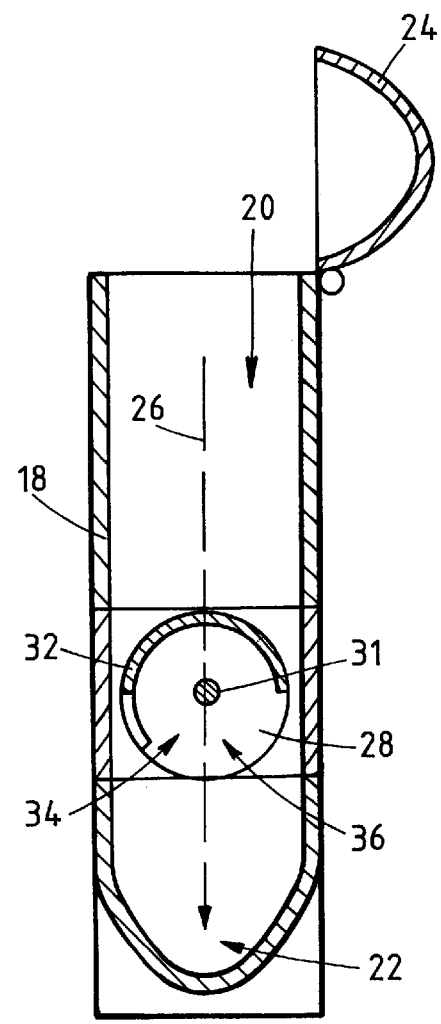

The vertical portion 14 of the housing 12 provides a discharge station 17 for periodically dispensing candies. The discharge station 17 has a hinged lid 24 attached to the inlet section 18 which may be pivoted to an open position thereby to allow access to the loading chamber 20 (FIGS. 2A and 2B). The dispensing opening 22 is located below the loading chamber 20 to define a substantially vertical discharge path, as indicated by arrow 26. A dispensing mechanism such as cradle 28 is disposed in the discharge path 26 and supported for rotation about a cradle axle 31. The cradle 28 has a partially cylindrical sidewall 32 defining a recess 34 sized to accept at least one piece of real candy. A slot 36 provides access to and from the recess 34. The cradle 28 is rotatable to a first position in which the slot 36 is disposed toward the loading chamber 20. Thus, in the first position, pieces of candy in the loading chamber 20 may pass through the slot 36 and into the recess 34. The cradle 28 continues to rotate to a second position in which the slot 36 is disposed toward the dispensing opening 22, as illustrated in FIG. 2B. In this position, pieces of candy drop out of the recess 34 to be discharged from the dispensing opening 22. The cradle 28 is sized so that pieces of candy in the loading chamber 20 are prevented from passing through the discharge path 26. As a result, only the candy pieces located in the recess 34 pass through the discharge path when the cradle 28 reaches the second position. In this manner, the cradle 28 is operable to periodically dispense pieces of candy.

The apparatus of the present invention as described above provides a novel candy dispensing machine. When the discharge station 17 is operated simultaneously with one or more simulated stations, the candy dispenser 10 creates the appearance that the machine actually forms the pieces of real candy that are dispensed. In reality, wrapped pieces of real candy from the loading chamber 20 are being periodically dispensed by the cradle 28 through the discharge path 26 to thereby exit the dispensing opening 22.

Figure 6:
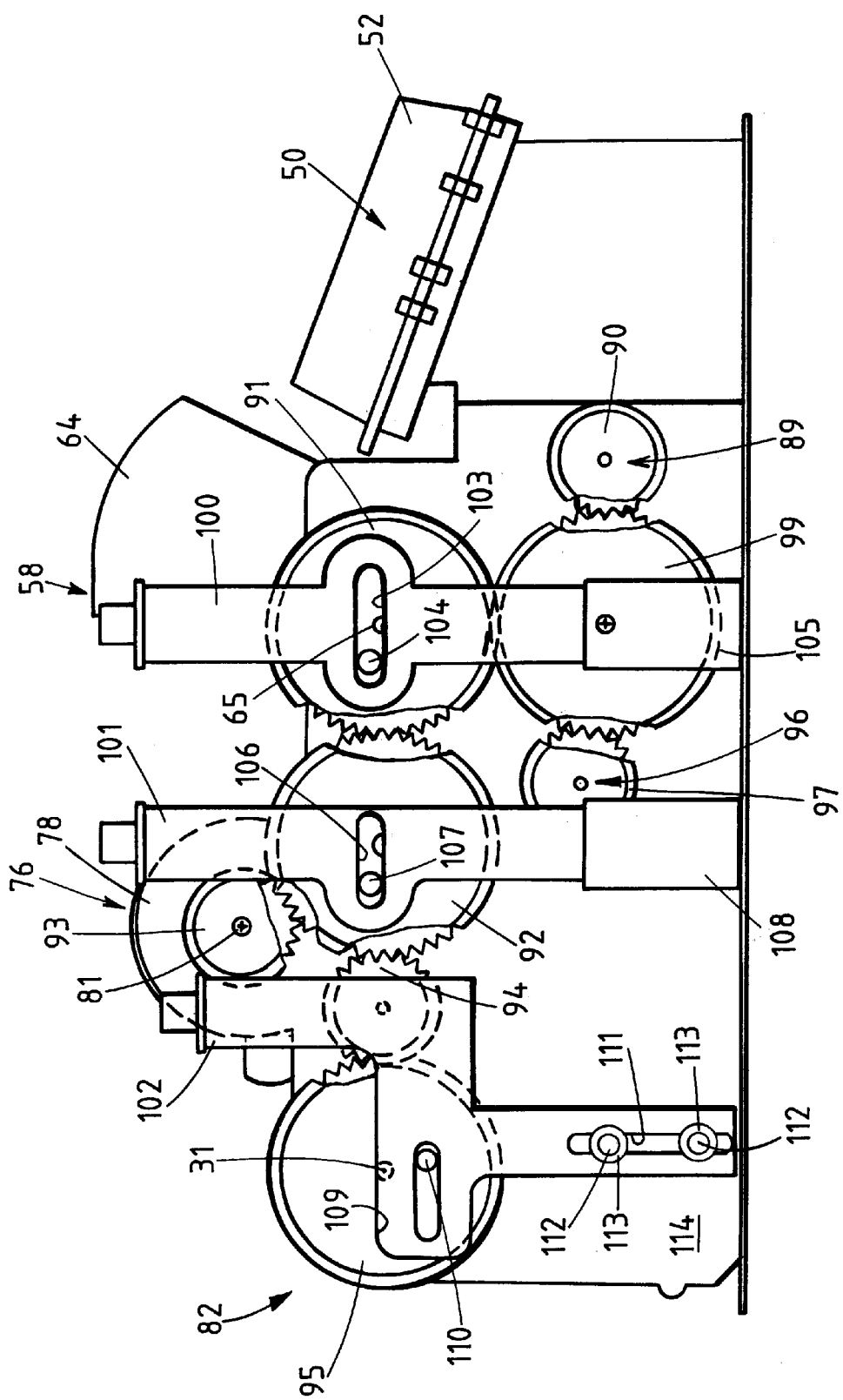
FIG. 6 is a rear elevation view of the candy dispenser of FIG. 1 with the housing and other components removed for clarity.

The moving members of the discharge and simulated processing stations described above are operated by a suitable drive assembly. In the currently preferred embodiment, a drive train 82 is provided for operating the moveable members, as illustrated in FIGS. 5 and 6. The impeller shaft 55 which supports the impeller 54 of the simulated mixing station 50 extends through a bottom of the hopper 52 (FIGS. 1 and 5). A first bevel gear 84 is attached to the impeller shaft 55. A composite gear 85 has a bevel gear portion 86 which mates with the first bevel gear 84 and a radial gear portion 87. The radial gear portion 87 of the composite gear 85 meshes with the inside gear 88 of a twin idle gear 89. The twin idle gear 89 also has an outside gear 90 which mates with an outside idle gear 99 (FIG. 5). The outside idle gear 99 mates with a form cylinder gear 91 (FIG. 6) attached to the form cylinder axle 65. The form cylinder gear 91 is enmeshed with a piston gear 92, which will be described in greater detail below. The piston gear 92 engages a wrap cylinder gear 93 attached to the wrapped cylinder axle 81, and an idle gear 94. The idle gear 94 engages a cradle gear 95 attached to the cradle axle 31. Referring back to the outside idle gear 99, that gear also engages a twin transfer gear 96 having an outside portion 97 and an inside portion 98 (FIG. 5). From the above, it will be appreciated that rotation of the twin transfer gear 96 causes simultaneous rotation of the first bevel gear 84 connected to the impeller shaft 55, the form cylinder gear 91 connected to the form cylinder axle 65, the wrap cylinder gear 93 connected to the wrap cylinder axle 81, and the cradle gear 95 connected to the cradle axle 31. Thus, rotation of the twin transfer gear 96 causes simultaneous operation of all the simulated stations as well as the discharge station 17.

It will further be appreciated that the gear train 82 actuates the pistons 38–40. As best illustrated in FIG. 6, first, second and third piston actuators 100, 101, 102 are provided for reciprocating the piston caps 44–46. The first piston actuator 100 has a horizontal slot 103 for accepting a pin 104 projecting from the form cylinder gear 91. A bottom end of the first piston actuator 100 is slidably supported in a base 105 so that, as the pin 104 rotates with the form cylinder gear 91, the first piston actuator 100 reciprocates up and down. The slot 103 is sufficiently long to allow the pin 104 to slide back and forth across a full range of motion as the form cylinder gear 91 rotates.

The second piston actuator 101 similarly has a slot 106 sized to accept a pin 107 projecting from the piston gear 92. A bottom of the second piston actuator 101 is also slidably supported in base 108 to allow the piston to reciprocate up and down as the piston gear 92 rotates.

The third piston actuator 102 also has a horizontal slot 109 which accepts a pin 110 projecting from the cradle gear 95.

A bottom portion of the third piston actuator 102 has a vertical slot 111 through which a pair of screws 112 and washers 113 are inserted. The screws 112 and washers 113 are fastened to a substructure 114 and are sufficiently loose to allow the third piston actuator 102 to slide in a vertical direction as the cradle gear 95 rotates.

Top ends of the piston actuators 101–102 engage inside surfaces of the piston caps 44–46, respectively, so that operation of the piston actuators causes the piston caps to rise and fall. Because the motion of the piston actuators 101–102 are caused by pins attached directly to gears in the gear train 82, the simulated pumping station 37 is operated simultaneously with the other simulated and real stations.

An actuator is provided for driving the gear train 82. In the illustrated embodiment, the actuator is a motor 116 having a rotatable shaft 117. A worm gear 118 is attached to the shaft 117 and engages a drive gear 115. The drive gear 115 is enmeshed with an idle gear 119 which, in turn, engages the inside portion 98 of the twin transfer gear 96. Thus, rotation of the motor shaft 117 drives the gear train 82 to thereby operate the candy dispenser 10. While the motor 116 is shown as providing the mechanical rotation, it will be appreciated that other mechanisms, such as a crank arm, may be used in accordance with the present invention.

In accordance with the currently preferred embodiment, the motor 116 is connected to a power source such as a battery (not shown). First and second leads 120, 121 extend from the motor to power source to form a circuit. A button 122 (FIG. 1) is provided with a contact which, when depressed, completes the circuit to operate the motor. An on/off switch may also be provided which prevents the circuit from being made, regardless of the position of the button 122.

From the above, it will be appreciated that the present invention brings to the art a new and improved candy dispenser. The candy dispenser includes one or more simulated candy processing stations as well as a functioning dispensing station which discharges wrapped pieces of real candy. The simulated and functional stations operate simultaneously to provide the appearance that the candy is actually being formed and wrapped by the machine.

The foregoing detailed description has been given for clearness of understanding only, and no unnecessary limitations should be understood therefrom, as modifications would be obvious to those skilled in the art.

What is claimed:

1. A candy dispenser simulating a candy factory, the candy dispenser comprising:

a housing;

a gear train disposed within the housing;

an actuator adapted to operate the gear train;

a simulated candy mixing station comprising a hopper, an impeller supported for rotation inside the hopper and operatively connected to the gear train, and simulated unformed candy disposed inside the hopper;

a simulated candy forming station comprising a rotatable form cylinder operatively connected to the gear train, and a simulated piece of candy formed at an outer periphery of the form cylinder;

a simulated candy wrapping station comprising a rotatable wrap cylinder operatively connected to the gear train, and a simulated wrapper disposed about an outer periphery of the wrap cylinder; and a wrapped candy discharge station having a loading chamber sized to house at least one piece of candy, a dispensing opening, and a discharge path extending from the loading chamber to the dispensing opening, a rotatable cradle disposed in the discharge path and operatively connected to the gear train, the cradle responsive to operation of the gear train to rotate to a first position in which the cradle prevents passage of candy through the dispensing opening, and a second position in which the cradle permits passage of candy from the loading chamber to the dispensing opening.

2. The candy dispenser of claim 1, further comprising a spring-biased shield pivotally mounted to and coaxial with the form cylinder, the shield operatively connected to the gear train to move from a retracted position in which the shield allows access to the form cylinder, and an extended position in which the shield closes off the form cylinder, the spring returning the shield to the retracted position.

3. The candy dispenser of claim 2, in which the form cylinder has a lug and the shield has a flange portion, the lug positioned to temporarily engage the flange portion as the form cylinder rotates thereby to pivot the shield from the retracted position to the extended position.

4. The candy dispenser of claim 1, in which the gear train is operatively connected to the impeller by an impeller axle carrying a first bevel gear, the first bevel gear mating with a second bevel gear of the gear train.

5. The candy dispenser of claim 1, in which the form cylinder rotates about a form axle, the form axle carrying a form gear operatively connected to the gear train.

6. The candy dispenser of claim 1, in which the wrap cylinder rotates about a wrap axle, the wrap axle carrying a wrap gear operatively connected to the gear train.

7. The candy dispenser of claim 1, in which the cradle is supported for rotation about a cradle axis, a cradle gear connected to a rear end of the cradle and operatively connected to the gear train.

8. The candy dispenser of claim 1, further comprising a simulated candy material pumping station in which the housing further includes a first piston opening, a first simulated piston cap is disposed in the first piston opening, and a first actuator has an upper end in contact with the first simulated piston cap and is operatively connected to a gear in the gear train, the first actuator reciprocating up and down along a substantially vertical path as the gear rotates.

9. The candy dispenser of claim 1, in which the actuator is a motor, a power source is connected to the motor, and a switch is operatively connected between the motor and the power source, the switch operable between an off position in which the power source is disconnected from the motor and an on position in which the power source is connected to the motor.

10. The candy dispenser of claim 1, in which the form cylinder rotates about a form axle, the form axle carrying a form gear operatively connected to the gear train.

11. The candy dispenser of claim 10, further comprising a simulated wheel assembly attached to a front end of the form axle.

12. Apparatus for simulating the formation of and dispensing cylindrically shaped chocolate candies, the apparatus comprising:
 a housing;
 a gear train disposed within the housing;
 an actuator adapted to operate the gear train;
 a simulated chocolate mixing station comprising a hopper, an impeller supported for rotation inside the hopper and operatively connected to the gear train, and simulated chocolate nuggets disposed inside the hopper;
 a simulated forming station comprising a rotatable form cylinder operatively connected to the gear train, and a simulated cylindrically shaped chocolate candy formed at an outer periphery of the form cylinder;
 a simulated wrapping station comprising a rotatable wrap cylinder operatively connected to the gear train, and a simulated wrapper disposed about an outer periphery of the wrap cylinder; and
 a discharge station having a loading chamber sized to house at least one wrapped, cylindrically shaped chocolate candy, a dispensing opening, and a discharge path extending from the loading chamber to the dispensing opening, a rotatable cradle disposed in the discharge path and operatively connected to the gear train, the cradle responsive to operation of the gear train to rotate to a first position in which the cradle prevents passage of a cylindrically shaped chocolate candy through the dispensing opening, and a second position in which the cradle permits passage of a cylindrically shaped chocolate candy from the loading chamber to the dispensing opening.

13. The dispenser of claim 12, in which the mixing, forming, wrapping, and discharge stations operate continuously.

14. A candy dispenser simulating a candy factor, the candy dispenser comprising:
 a housing;
 a first simulated candy processing station, the first simulated candy processing station being of a first type;
 a second simulated candy processing station, the second simulated candy processing station being of a second type different than the first type;
 a candy discharge station having a loading chamber sized to house at least one piece of candy, a dispensing opening, and a discharge path extending from the loading chamber to the dispensing opening, the candy discharge station being operable to periodically dispense pieces of candy; and
 a drive assembly disposed within the housing, the drive assembly being coupled to operate the first simulated candy processing station, the second simulated candy processing station, and the candy discharge station.

15. The candy dispenser of claim 14 additionally comprising a motor operatively coupled to drive the drive assembly.

16. The candy dispenser of claim 14 wherein said drive assembly comprises a gear train.

17. A candy dispenser simulating a candy factory, the candy dispenser comprising:
 a housing;
 a gear train disposed within the housing;
 an actuator adapted to operate the gear train;
 a simulated candy processing station operatively coupled to the gear train; and
 a candy discharge station having a loading chamber sized to house at least one piece of candy, a dispensing opening, a discharge path extending from the loading chamber to the dispensing opening, and a candy dispensing mechanism to periodically dispense pieces of candy when the actuator is actuated, wherein the candy dispensing mechanism is supported for rotation and operatively connected to the gear train, the candy dispensing mechanism being responsive to operation of the gear train to rotate to a first position in which the candy dispensing mechanism prevents passage of candy through the dispensing opening, and a second position in which the candy dispensing mechanism permits passage of candy from the loading chamber to the dispensing chamber.

18. A candy dispenser simulating a candy factory, the candy dispenser comprising:

a housing;

a gear train disposed within the housing;

an actuator adapted to operate the gear train;

a simulated candy processing station having a rotatable member operatively coupled to the gear train, wherein the simulated candy processing station comprises a mixing station including a hopper, the rotatable member is an impeller supported for rotation inside the hopper, and simulated unformed candy is disposed inside the hopper; and a candy discharge station having a loading chamber sized to house at least one piece of candy, a dispensing opening, a discharge path extending from the loading chamber to the dispensing opening, and a candy dispensing mechanism to periodically dispense pieces of candy when the actuator is actuated.

19. A candy dispenser simulating a candy factory, the candy dispenser comprising:

a housing;

a gear train disposed within the housing;

an actuator adapted to operate the gear train;

a simulated candy processing station having a rotatable member operatively coupled to the gear train, wherein the simulated candy processing station comprises a forming station, the rotatable member is a form cylinder, and a simulated piece of candy is formed at an outer periphery of the form cylinder; and a candy discharge station having a loading chamber sized to house at least one piece of candy, a dispensing opening, a discharge path extending from the loading chamber to the dispensing opening, and a candy dispensing mechanism to periodically dispense pieces of candy when the actuator is actuated.

20. A candy dispenser simulating a candy factory, the candy dispenser comprising:

a housing;

a gear train disposed within the housing;

an actuator adapted to operate the gear train;

a simulated candy processing station having a rotatable member operatively coupled to the gear train, wherein the simulated candy processing station comprises a wrapping station, the rotatable member is a wrap cylinder, and a simulated wrapper is disposed about an outer periphery of the wrap cylinder; and a candy discharge station having a loading chamber sized to house at least one piece of candy, a dispensing opening, a discharge path extending from the loading chamber to the dispensing opening, and a candy dispensing mechanism to periodically dispense pieces of candy when the actuator is actuated.

* * * * *